United States Patent
Fujii et al.

(10) Patent No.: US 6,728,198 B2
(45) Date of Patent: Apr. 27, 2004

(54) OPTICAL INFORMATION MEDIUM AND RECORDING METHOD THEREFOR

(75) Inventors: Toru Fujii, Tokyo (JP); Toshiaki Tajima, Tokyo (JP); Yuji Tomizawa, Tokyo (JP); Ryou Negishi, Tokyo (JP); Emiko Hamada, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 10/162,300

(22) Filed: Jun. 4, 2002

(65) Prior Publication Data

US 2002/0145967 A1 Oct. 10, 2002

Related U.S. Application Data

(62) Division of application No. 09/340,212, filed on Jun. 25, 1999, now Pat. No. 6,452,899.

(30) Foreign Application Priority Data

Jul. 8, 1998 (JP) .......................................... 10-192771

(51) Int. Cl.$^7$ ................................................. G11B 7/24
(52) U.S. Cl. .................................... 369/275.4; 428/64.4
(58) Field of Search ........................... 369/275.4, 275.3, 369/275.1, 44.26, 13.35, 275.2, 280, 112.23, 283, 279, 277, 278; 428/64.2, 64.3, 64.1, 64.4, 64.9, 694 ML

(56) References Cited

U.S. PATENT DOCUMENTS

| 5,148,421 A | * | 9/1992 | Satoh et al. ............. 369/44.23 |
| 5,479,382 A | * | 12/1995 | Nishida et al. .......... 369/13.35 |
| 5,763,037 A | * | 6/1998 | Ohtomo et al. ............. 428/64.1 |
| 6,049,521 A | * | 4/2000 | Aratani ....................... 369/280 |
| 6,118,752 A | * | 9/2000 | Miyagawa et al. ...... 369/275.3 |
| 6,229,785 B1 | * | 5/2001 | Kitaura et al. ........... 369/275.4 |
| 6,246,656 B1 | * | 6/2001 | Kawakubo et al. ......... 369/112 |
| 6,287,660 B1 | * | 9/2001 | Hosaka et al. ............. 428/64.1 |
| 6,400,677 B2 | * | 6/2002 | Kagawa et al. .......... 369/275.4 |
| 6,440,333 B2 | * | 8/2002 | Masuhara .................. 264/1.33 |

* cited by examiner

*Primary Examiner*—Ali Neyzari
(74) *Attorney, Agent, or Firm*—Flynn, Thiel, Boutell & Tanis, P.C.

(57) ABSTRACT

An optical information medium made up of a transparent substrate capable of allowing a recording laser beam to penetrate therethrough; a recording layer formed on the transparent substrate; and a reflective layer formed on the recording layer and reflecting a reproducing laser beam thereupon. A numerical aperture of an objective lens of an optical pickup for irradiating the recording laser beam on the recording layer is approximately 0.65, and the numerical aperture of an objective lens of the optical pickup for irradiating the recording laser beam on the reflection layer is approximately 0.60. An inclination angle θ at both edges of the groove for tracking, being formed spirally on the surface of the transparent substrate on which the recording layer is formed, with respect to the main surface of the transparent substrate, is selected to be from 55° to 75°. An index ∝, expressed by 1−Dr/Ds when assuming that the depth of the groove on the transparent substrate is Ds and the depth of the recording layer at the position of said groove is Dr, is selected to be from 0.2 to 0.4. Further, the full width at half maximum of the groove on the transparent substrate is selected to be from one-third (⅓) to a half (½) of the pitch p of the groove. With this optical information medium, it is possible to record high density signals as signals that are readable optically, as well as to record them with stability.

24 Claims, 2 Drawing Sheets

OPTICAL INFORMATION MEDIUM AND RECORDING METHOD THEREFOR

This is a division of Ser. No. 09/340,212, filed Jun. 25, 1999 now U.S. Pat. No. 6,452,899.

BACKGROUND OF THE INVENTION

1. Field of the Invention

The present invention relates to an optical information medium, on which can be recorded information which is optically reproducible, and a recording method for recording signals that are optically readable, and in particular relates to the optical information medium and the recording method, for realizing a recording/reproducing system suitable for a high density recording medium on which the information can be recorded and reproduced with red color laser beam of a short wavelength of from 630 nm to 670 nm.

2. Description of Related Art

With the recent advances in development and application of a short wavelength laser, standardization has proceeded on a standard for DVDs (Digital Versatile Discs) which enables recording and reproducing at a high density, as well as the practical application thereof. The DVD has a data area at least provided on one surface of the substrate thereof, so as to form so-called pits as a means for information thereon, and a reflection layer made of metal film which is formed on that data recording area.

For the DVDs, a different standard for high density is determined, compared to the standard for the optical information medium being the most general or popular now, such as a CD (Compact Disc). For example, with the optical pickup, it is determined to use the red color laser of short wavelength from 630 nm to 670 nm, and to use an objective lens of high numerical aperture (NA), such as of 0.6 in NA, etc. Accompanying to this, for dealing with a disc tilt, the thickness thereof is determined 0.6 mm, to be about half (½) of that of the CD. However, for maintaining compatibility or interchangeability in sizes between the CD having thickness of 1.2 mm, the disc of DVDs applies such structure that two pieces of discs are aligned and bonded together. According to the DVD standard, it is standardized that one layer of the disc has recording capacity of 4.7 GB at the maximum, in average thereof, i.e., video and audio information for 133 minutes long.

In the standardization of the DVD standard, in the similar manner of the relationship between the CD-ROM and CD-R or CD-RW, at the beginning were assumed both an optical information medium for use of reproduction exclusively (for reproduction only) and an optical information medium being recordable. However, the standardization at the beginning was made only on a DVD-Video for video and on a DVD for reproduction only, such as DVD-ROM which is targeted for recording computer data, but the standardization on the recordable DVD was postponed. Under such a situation is desired development of an optical information medium, on which recording is possible with high density at the maximum recording capacity of 4.7 GB on one layer of the disc.

With such a DVD, i.e., the high density recording medium as mentioned in the above, the recording is performed with a high density, tracking pitch of 0.74 μm and minimal pit size of 0.4 μm (0.44 μm in case of double layer recording), comparing to a tracking pitch of 1.6 μm and minimal pit size of 0.83 μm in the CD. A means for enabling the reproduction with the pits of such a high density is the use of red color laser of a short wavelength from 630 nm to 670 nm and the use of objective lens of a high numerical aperture (NA), such as of 0.6 in NA, as mentioned in the above.

On the surface of the substrate of these recordable DVDs, a groove of a pitch of 0.74 μm as mentioned above is formed for tracking, and on the surface of the substrate having that groove is provided a recording layer including an organic dye. Further on the organic dye is provided a reflection layer, such as of Au, Ag or Al, etc. For recording signals on that recordable DVD, there is a necessity to radiate a recording laser beam upon the recording layer mentioned above, so as to form the pits of various sizes, including the minimum size of 0.4 μm. For that purpose, the red color laser of a short wavelength from 630 nm to 670 nm is used, and the beam spot thereof must be focused onto a very narrow region to perform the recording.

SUMMARY OF THE INVENTION

A first object, in accordance with the present invention, for solving the drawbacks in the technology for performing recording on the optical information medium corresponding to the high density recording, is to provide a recording method for an optical information medium, able to record optically readable signals at a high density. A second object, in accordance with the present invention, is to provide an optical information medium which enables stable recording of the signals, thereby easily obtaining a reproduction signal satisfying the standard determined in relation to the high density information medium, such as the DVD standard mentioned above.

As mentioned previously, in a DVD player for reproducing from a high density recording medium, such as a DVD, which is standardized at the present time, the numerical aperture (NA) of the objective lens of the optical pickup is 0.6, for radiating reproduction laser beam. The larger the aperture of the objective lens in the optical pickup, in other words, the larger the NA of the objective lens, the smaller the beam spot can be focused upon the optical information medium, thereby enabling reproduction at a high density.

In the similar manner, also when recording onto the optical information medium, the larger the NA of the objective lens for radiating the recording laser beam, the smaller the beam spot of the recording laser beam that can be radiated upon the optical information medium, thereby enabling recording at a high density.

However, when the NA of the objective lens is large, the focus point is likely to shift due to the inclination of the disc to an optical axis of the objective lens caused by the curvature of the discs, therefore, there may easily occur a problem, such as deterioration in the deviation of pit-and-land length, accompanying with the worth in balance between or among the pits of various length, including long and short ones which are formed through the recording operation. Accordingly, in accordance with the present invention, first of all, the NA of the objective lens in the optical pickup when recording is larger than that when reproducing. Second, for enabling stable recording of signals, even under the condition where the objective lens (o) has a large NA, an index ∝ for the film thickness of a land/groove of said recording layer is expressed by 1−Dr/Ds when assuming that depth of said groove is Ds and depth of said recording layer at the position of said groove is Dr, and the width of the groove 3 are selected, appropriately.

Namely, according to the present invention, there is provided a recording method for an optical information medium, comprising: a transparent substrate 1 for allowing a recording laser beam to penetrate therethrough; a recording layer 12 formed on said transparent substrate 1; and a reflective layer 13 formed on said recording layer 12 for reflecting the reproducing laser beam thereupon, wherein, when recording optically readable signals by means of the recording laser beam incident from said transparent substrate 1, the NA of an objective lens (o) of an optical pickup for irradiating the recording laser beam on said recording layer 12 is selected to be approximately 0.65, while the NA of an objective lens of the optical pickup for irradiating the reproducing laser beam on said reflecting layer 13 is selected to be approximately 0.6.

In more details, the NA of the objective lens (o) of the optical pickup for irradiating the recording laser beam on said recording layer 12 is determined to be 0.65±0.02, and the NA of the objective lens of the optical pickup for irradiating the reproducing laser beam is determined to be 0.60±0.02. In this instance, the wavelength of the recording laser beam lies from 630 nm to 670 nm, in the same region of the wavelength of the reproducing laser beam.

When this recording method for the optical information medium, since the NA of the objective lens (o) of the optical pickup is selected to be approximately 0.65 and larger than the NA of 0.6 for the reproducing laser beam, the beam spot can be focused smaller when recording. Therefore, the recording power can be focused into a spot smaller in beam diameter than in the conventional art.

On the other hand, as mentioned above, when the NA of the objective lens is large, the focus point is likely to shift due to the inclination of the disc to an optical axis of the objective lens caused by the tilt of the discs, therefore, there may easily occur a problem, such as a deterioration in the deviation of pit-and-land length, accompanying with the worth in balance between or among the pits of various lengths, which are formed through the recording.

Then, according to the present invention, an inclination angle at both sides of said groove with respect to the recording laser beam incident surface, which is the main surface of said transparent substrate, is selected from 55° to 75°. With this, even with the beam which is focused by the objective lens (o) with a large NA, because of accurate tracking and increase in contrast due to light interference at the pit edge portion when recording, the modulation amplitude of all the long and short pits are optimized.

For enabling accurate tracking and recording corresponding to the DVD standard under the condition where the NA of the objective lens (o) is 0.65±0.02, the inclination angle θ must be equal to or greater than 55°, and the larger the better, under the condition that the transparent substrate 1 has a thickness of 0.6±0.02 mm and a spiral groove 3 for tracking at a pitch of 0.74±0.01 μm, formed on the surface on which the recording layer 12 is formed. However, if the inclination angle of the groove 3 exceeds 75°, the transparent substrate 1 is difficult to remove from a mold when produced by a method of injection molding, thereby bringing about a remarkable decrease in quality of the product and deterioration in productivity thereof. Therefore, the inclination angle θ must be determined not to exceed 75°.

Further, when assuming that the depth of the groove 3 on the transparent substrate 1 is Ds and the depth of the recording layer at the position of said groove is Dr, the index $\alpha$ for the film thickness of the land/groove, expressed by 1−Dr/Ds, is selected from 0.2 to 0.4. This index $\alpha=1-Dr/Ds$ for the film thickness of the land/groove indicates the degree of leveling of the recording layer 12 when the recording layer 12 is formed by applying the organic dye on the transparent substrate having the groove 3 for tracking, by means of the spin coating method. The value of this film thickness index $\alpha$ indicates that the ratio between the depth of the groove on the surface of the recording layer 12 and the depth of the groove 3 on the surface of the transparent substrate 1 comes to be larger as the result of proceeding or advancing of the leveling on the recording layer.

This film thickness index $\alpha$ is preferably small from the view point of the modulation amplitude which is obtained when being reproduced after recording. For obtaining the higher modulation amplitude of the DVD standard, under the condition that the NA of the objective lens (o) is 0.65±0.02 when recording and the NA of the objective lens (o) is 0.60±0.02 when reproducing, the index $\alpha$ must be equal to or less than 0.4 ($\alpha \leq 0.4$).

On the other hand, if this index $\alpha=1-Dr/Ds$ is too small, as a result of a small degree in leveling, the concave/convex of the reflective layer 13 comes to be large, thereby reducing the reflectivity. For obtaining high reflectivity, with the reflectivity being equal to or greater than 45% being determined in the DVD standard, the index $\alpha$ is selected to be equal or greater than 0.2 ($\alpha>0.2$).

Further, a full width at half maximum (FWHM) of the groove 3 on the transparent substrate 1 is selected from one-third (⅓) to a half (½) of the pitch p of the groove 3. The FWHM of the groove 3 means the width of the groove at the position where the depth Ds is a half (½) of the depth Ds of the groove 3 which is formed on the transparent substrate 1. When the NA of the objective lens (o) is set to be 0.65±0.02 when recording, although previously mentioning that the beam spot of the recording laser beam can be made smaller, however, if the FWHM of the groove 3 is widened to exceed. a half (½) of the pitch p (0.74 μm) of the groove 3, no effect can be obtained by focusing the recording laser beam to the beam spot. On the other hand, if the FWHM of the groove 3 is narrowed so as not to reach to one-third (⅓) of the groove 3, sufficient modulation amplitude cannot be obtained when reproducing by selecting the NA of the objective lens (o) to be approximately 0.60±0.02.

According to the present invention, when recording signals onto the optical information medium to meet the high density recording, it is possible to perform recording while focusing the recording laser beam into a small region or spot, by means of the optical pickup having the objective lens (o) of the NA 0.65±0.02 larger than the NA 0.60±0.02 of the objective lens for reproducing, thereby enabling recording at a high density. Moreover, the drawbacks which are likely to occur accompanying the enlargement in the NA of the objective lens (o) in the optical pickup can be solved by selecting the inclination angle of both sides of the groove for tracking on the transparent substrate of the optical information medium, the ratio between the width and pitch of the groove, or the index for film thickness of land/groove of the recording layer, appropriately. With this, it is possible to obtain reproduced signals which satisfy the requirements determined for a high density optical information medium, such as the DVD standard, with ease.

DESCRIPTION OF THE PREFERRED EMBODIMENTS

Hereinafter, detailed explanation of the embodiments according to the present invention will be given by referring to the attached drawings.

Figure 1:
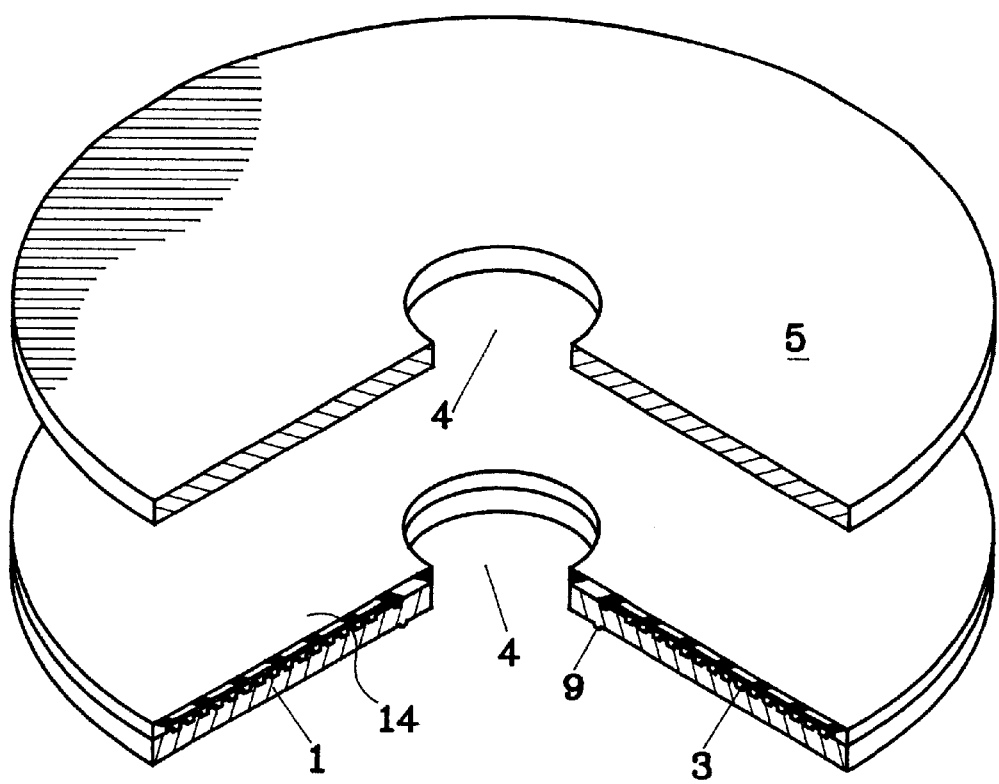
FIG. 1 is an exploded perspective view of two pieces of substrates in an example of an optical information medium according to the present invention, under a condition before they are bonded together, including a partial cross-section view thereof.
Figure 2:
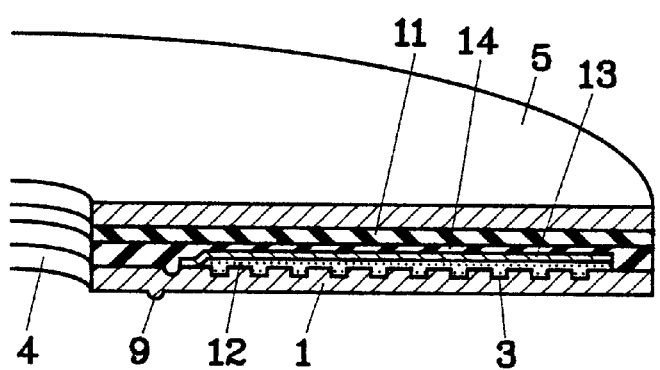
FIG. 2 is a perspective view including a partial cross-section view of the optical information medium after being bonded together.

A write-once optical information medium is shown in FIGS. 1 and 2, which is bonded on both surfaces and is recordable and reproducible from one surface thereof, as an example of the optical information medium according to the present invention.

A transparent substrate 1 is made from a substrate of a disc-like shape, having a center hole 1 in the central portion thereof. This transparent substrate 1 is most preferably made of a transparent resin, such as polycarbonate, polymethyl methacrylate (PMMA), etc.

On the one surface of the substrate 1 having the transparency, and outside of the above-mentioned center hole 4, there is provided a clamping area which will be mentioned later, and the outside thereof forms a data recording area or region. In the data recording area of the transparent substrate 1 is formed a spiral-like groove 3 for tracking. The pitch of the groove 3 for tracking is 0.74 $\mu$m at the standard.

Further, on the portion of the main surface of the data recording area is formed or coated a recording layer 12. The recording layer 12 is formed, for example, by applying or coating an organic dye by means of a spin coat method or the like. Furthermore, on the recording layer 12 is formed a reflection film 13 made of metal film of gold, aluminum, silver, copper or an alloy thereof. On the reflection layer 13 is formed a protection film 14, such as of an ultraviolet ray curable resin.

Moreover, the other piece of substrate 5 is prepared other than the transparent substrate 1. This substrate 5 is made of the same material as the transparent substrate 1, as well as has the same size, however, it is not provided with the groove 2, the recording layer 12 and the reflection layer on the main surface thereof, as are provided on the transparent substrate 1 mentioned above. Of course, otherwise, the other substrate 5 may be provided with the groove 3, the recording layer 12 and the reflection layer 13, in the similar manner of the transparent substrate 1 mentioned above.

Next, those two pieces of substrates 1 and 5 are aligned and pasted together. For example, reactive curable resin is applied or coated on the main surface of at least one of those two pieces of substrates 1 and 5 as adhesive, by means of a spin coating method or the like, and is hardened after they are stacked and bonded together opposing those surfaces to each other. In this manner, the two substrates 1 and 5 are bonded together at the main surfaces thereof, with an adhesive layer 11 formed by hardening the above-mentioned reactive curable resin. In this instance, the transparent substrate 1 is adhered on the surface, on which the recording layer 12 and the reflective layer 13 are formed.

In the example mentioned above, on the transparent substrate 1 having the recording layer 12 and the reflective layer 13 on the surface thereof formed with the groove 3, is bonded the other substrate 5 having no recording layer 12 and reflective layer 13 thereon. In this instance, the recording and/or reproducing can be done only on one side surface thereof. The other substrate 5 may have no transparency, or be colored for maintaining a durability against light, or have a region on the surface, where letters or patterns can be written in.

On the other hand, preparing two pieces of the transparent substrates 1, each having the recording layer 12 and the reflective layer 13 on the surface thereof formed with the groove 3, it is also possible to bond them together opposing the recording layer 12 and the reflective layer 13 to each other, so as to obtain an optical information medium, with which the recording and/or reproducing can be performed on both surfaces thereof.

However, in FIGS. 1 and 2, reference numeral 9 indicates a ring-like convex portion formed outside of the data recording area on the side surface of the transparent substrate 1, upon which the recording laser beam is incident. This is for the purpose of protecting the recording surface of the optical information medium from touching with the surface of other one, when the plurality of the optical information media are stacked.

Figure 3:
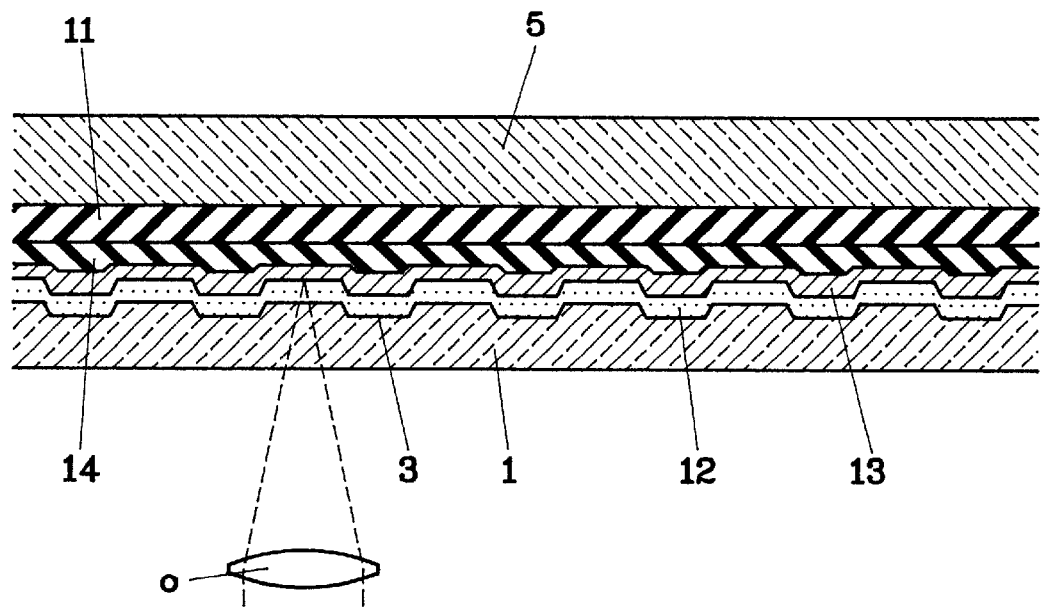
FIG. 3 is a vertical side cross-section view showing a principle portion of a recording region of the optical information medium.
Figure 4:
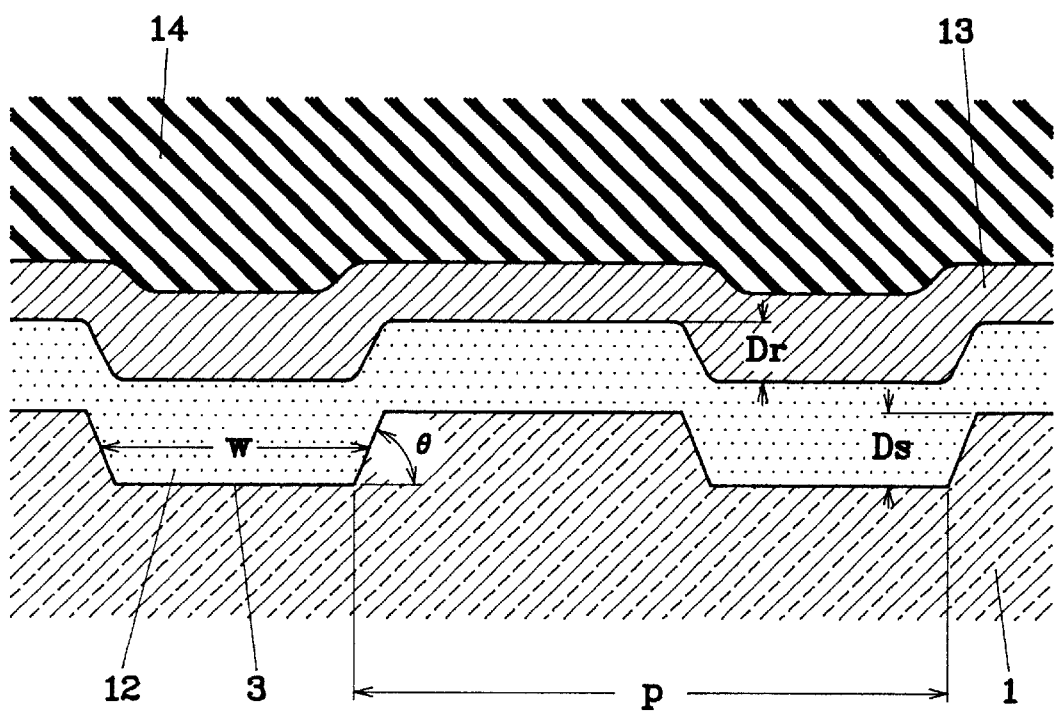
FIG. 4 is an enlarged vertical side cross-section view showing the principle portion of the recording region of the optical information medium, with sizes and angles thereof.

FIG. 3 is a vertical cross-section view showing a principle portion, in particular, a portion of a recording area of the optical information medium, where the above-mentioned recording layer 12 and the reflective layer 13 are formed. FIG. 4 shows an enlarged cross-section view of the portion of those recording layer 12 and the reflective layer 13, further in details thereof.

As shown in FIG. 4, the spiral-like groove 3 for tracking is provided on the surface of the transparent substrate 1, on which side the recording layer 12 is formed, wherein an inclination angle $\theta$ at both edges of the groove with respect to the surface of the transparent substrate 1 through which the recording laser beam penetrates, is selected from 55° to 75°.

Further, an index $\alpha$ for the film thickness of land/groove of the recording layer, which can be expressed by 1−Dr/Ds when assuming that the depth of the groove 3 on the transparent substrate 1 is Ds and the depth of the recording layer 12 at the position of this groove 3 is Dr, is selected from 0.2 to 0.4. This index $\alpha=1-Dr/Ds$ for the film thickness of the land/groove of the recording layer indicates a degree of leveling of the recording layer 12, when applying it by coating an organic dye on the transparent substrate 1 having the groove 3 for tracking, by means of the spin coating thereof. The larger the numerical value, the more the leveling proceeds. Namely, it indicates that the ratio between the depth of the groove on the surface of the recording layer 12 and the depth of the groove 3 on the surface of the transparent substrate 1 is large.

Also FWHM of the groove 3 on the transparent substrate 1 is selected to be from one-third (⅓) to a half (½) of the pitch p of the groove 3. The FWHM of the groove 3 means the width of the groove 3 at the position where the depth is a half (½) of the depth Ds of the groove 3 formed on the transparent substrate 1.

With respect to the optical information medium, the beam of the recording laser beam, from the side of the above-mentioned transparent substrate 1, is focused onto the recording layer 12 so as to perform the recording of signals, by determining the NA of the objective lens (o) at 0.65±0.02. As was mentioned previously, by making the NA of the objective lens (o) in the optical pickup when recording 0.65±0.02, larger than NA =0.60 of the objective lens when reproducing, it is possible to focus the spot of the recording laser beam smaller. Thereby, it is possible to obtain the recording with a high density.

Next, examples of the present invention will be explained by referring specific numerical values thereof.

EXAMPLE 1

A transparent substrate 1 having a groove 3 for tracking on one side of the main surfaces, of 0.31 $\mu$m in FWHM, 140 nm in depth, 65° in inclination angle at both edges of groove, and 0.74 μm in pitch, is prepared from a polycarbonate substrate of 120 mmψ in outer diameter, 15 mmψ in inner diameter, 0.597 mm in thickness, and 1.59 in refractive index.

On the side surface of the transparent substrate 1, having the groove 3 thereon, the recording layer 12 is formed by the spin coating film formation of a solution of cyanine dye (trimethylene dye).

The depth in position of the groove 3 mentioned above is 105 nm in the recording layer 12, and the index for film thickness of the land/groove of the recording layer is $\alpha=1-Dr/Ds=0.25$. Also, the FWHM of the groove 3 is 0.31μm as mentioned in above, therefore, it is approximately 42% of the pitch of the groove 3, i.e., 0.74 μm.

Further, Au is spattered onto the recording layer 12 so as to form the reflective layer 13 therewith. On this, an ultraviolet ray curable resin (SD 211 of Dainippon Ink Chemical Industry Co., Ltd.) is coated by the spin coating and is hardened by irradiating the ultraviolet ray on it, so as to form the protection layer 14 therewith. On this protection layer 14, applied with an adhesive of ultraviolet ray curable resin, the substrate is stacked and bonded together, which having the same material and size as that of the substrate mentioned above except that it does not have the groove thereon. And, the ultraviolet ray is irradiated on the adhesive to harden it, thereby producing the optical information medium.

On the optical information medium produced in this manner, an EFM-Plus signal (8–16 modulation signal) is recorded at a recording power of 10 mW and wavelength of 635 nm, using an optical pickup having the objective lens (o) of NA 0.65. After being recorded thereon, the signal is reproduced ten (10) times, repeating the operations of loading and unloading through a DVD player having the optical pickup of NA 0.60, which is available in the market. No reading error of the signal occurs, and a stable reproduction can be achieved. The modulation amplitude of the recorded signal is 64%, the maximum value of length errors of the pit and land is 6.0 nsec for each signal, the jitter is 7.5% and the reflectivity is 65%, respectively, thereby obtaining good or preferable results.

EXAMPLE 2

The optical information medium is produced in the same manner to that of Example 1 mentioned above, but the groove 3 for tracking on the main surface of the transparent substrate 1 is determined to be 0.28 μm in FWHM, 200 nm in depth, and 57° in inclination angle at both edges of the groove thereof, everything else being the same as in Example 1 mentioned above.

The depth at the position of the groove 3 mentioned above is 135 nm in the recording layer 12, and the index for film thickness of the land/groove of the recording layer is $\alpha=1-Dr/Ds$ 0.33. Also, the FWHM of the groove 3 is 0.28 μm as mentioned above, therefore, it is approximately 39% of the pitch of the groove 3, i.e., 0.74 μm.

On the optical information medium produced in this manner, an EFM-Plus signal is recorded at a recording power of 12 mW and wavelength of 655 nm, by using an optical pickup having the objective lens (o) of NA 0.66, in the same manner as Example 1 mentioned above. After being recorded thereon, the signal is reproduced ten (10) times, repeating the operations of loading and unloading through the DVD player having the optical pickup of NA 0.60, which is available in the market. No reading error of the signal occurs, and a stable reproduction can be obtained. The modulation amplitude of the recorded signal is 75%, the maximum value of the length errors of the pit and land is 5.0 nsec for each signal, the jitter is 6.7% and the reflectivity is 58%, respectively, thereby obtaining good or preferable results.

EXAMPLE 3

The optical information medium is produced in the same manner as in Example 1 mentioned above, but the groove 3 for tracking on the main surface of the transparent substrate 1 is determined to be 0.35 μm in FWHM, 200 nm in depth, and 72° in inclination angle at both edges of the groove, everything else being the same as in Example 1 mentioned above.

The depth at the position of the groove 3 mentioned above is 125 nm in the recording layer 12, and the index for the film thickness of the land/groove of the recording layer is $\alpha=1-Dr/Ds=0.38$. Also, the FWHM of the groove 3 is 0.35 μm as mentioned above, therefore, it is approximately 47% of the pitch of the groove 3, i.e., 0.74 μm.

On the optical information medium produced in this manner, an EFM-Plus signal is recorded at a recording power of 10 mW and wavelength of 635 nm, by using an optical pickup having the objective lens (o) of NA 0.64, in the same manner as Example 1. After being recorded thereon, the signal is reproduced ten (10) times, repeating the operations of loading and unloading through the DVD player having an optical pickup of NA 0.60, which is available on the market. No reading error of the signal occurs, and a stable reproduction can be achieved. The modulation amplitude of the recorded signal is 75%, the maximum value of the length errors of the pit and land is 5.0 nsec for each signal, the jitter is 6.7% and the reflectivity is 63%, respectively, thereby obtaining good or preferable results.

Comparison 1

The optical information medium is produced in the same manner as Example 1 mentioned above, but the groove 3 for tracking on the main surface of the transparent substrate 1 is determined to be 45° in inclination angle at both side surfaces thereof, everything else being the same as in Example 1 mentioned above.

The depth in position of the groove 3 mentioned above is 95 nm at the recording layer 12, and the index for film thickness of the land/groove of the recording layer is $\alpha=1-Dr/Ds=0.32$. Also, the FWHM of the groove 3 is 0.31 μm as mentioned above, therefore, it is approximately 42% of the pitch of the groove 3, i.e., 0.74 μm.

On the optical information medium produced in this manner, an EFM-Plus signal is recorded at a recording power of 10 mW and wavelength of 635 nm by using an optical pickup having the objective lens (o) of NA 0.65, in the same manner as Example 1. After being recorded thereon, the signal is reproduced ten (10) times, repeating the operations of loading and unloading through the DVD player having an optical pickup of NA 0.60, which is available in the market. However, the recorded signal can be reproduced only seven (7) times among the ten (10) times trials in the reproduction thereof. The modulation amplitude of the recorded signal is 54%, the maximum value of length errors of the pit and land is 18.0 nsec for each signal, the jitter is 10.5% and the reflectivity is 60%, respectively.

Comparison 2

The optical information medium is produced in the same manner as Example 1 mentioned above, but the groove 3 for tracking on the main surface of the transparent substrate 1 is determined to be 0.41 μm in FWHM and 45° in inclination angle at both side surfaces thereof, everything else being the same as in Example 1 mentioned above.

The depth in position of the groove 3 mentioned above is 80 nm in the recording layer 12, and the index for the film thickness of the land/groove of the recording layer is $\alpha=1-Dr/Ds=0.43$. Also, the FWHM of the groove 3 is 0.41 μm as mentioned above, therefore, it is approximately 55% of the pitch of the groove 3, i.e., 0.74 μm.

On the optical information medium produced in this manner, an EFM-Plus signal is recorded at a recording power of 14 mW and wavelength of 655 nm by using an optical pickup having the objective lens (o) of NA 0.66, in the same manner as in Example 1. After being recorded thereon, the signal is reproduced ten (10) times, repeating the operations of loading and unloading through a DVD player having the optical pickup of NA 0.60, which is available in the market. However, the recorded signal cannot be reproduced since the signal balance is bad as a whole. The modulation amplitude of the recorded signal is 54%, the maximum value of the length errors of the pit and land is 20.0 nsec for each signal, the jitter is 16.5% and the reflectivity is 48%, respectively.

Comparison 3

The optical information medium is produced in the same manner Example 1 mentioned above, but the groove 3 for tracking on the main surface of the transparent substrate 1 is determined to be 0.28 μm in FWHM and 70° in inclination angle at both side surfaces thereof, everything else being the same as in Example 1 mentioned above.

The depth of the groove 3 mentioned above is 115 nm at the recording layer 12, and the index for film thickness of the land/groove of the recording layer is $\alpha=1-Dr/Ds=0.18$. Also, the FWHM of the groove 3 is 0.28 μm as mentioned above, therefore, it is approximately 37% of the pitch of the groove 3, i.e., 0.74 μm.

On the optical information medium produced in this manner, an EFM-Plus signal is recorded at a recording power of 10 mW and wavelength of 635 nm by using an optical pickup having the objective lens (o) of NA 0.64, in the same manner as in Example 1. After being recorded thereon, the signal is reproduced ten (10) times, repeating the operations of loading and unloading through a DVD player having the optical pickup of NA 0.60, which is available in the market. However, the recorded signal cannot be reproduced since the signal balance is bad as a whole. The modulation amplitude of the recorded signal is 63%, the maximum value of the length errors of the pit and land is 19.0 nsec for each signal, the jitter is 14.5% and the reflectivity is 37%, respectively.

What is claimed is:

1. A recording method for an optical information medium comprising the steps of:
   providing a transparent substrate for allowing recording and/or reproducing laser beams to penetrate therethrough;
   forming a recording layer comprising a land portion and a groove portion on said transparent substrate by spin coating an organic dye thereon; and
   irradiating the recording laser beam onto the recording layer through the transparent substrate using a lens having a numerical aperture of approximately 0.65;
   wherein the transparent substrate has a spiral groove formed therein and a full width at half maximum of the groove is ⅓–½ of the pitch of the groove.

2. A recording method according to claim 1, comprising irradiating a reproducing laser beam onto the recording layer through the transparent substrate using a lens having a numerical aperture of approximately 0.6.

3. A recording method according to claim 1, wherein the numerical aperture of the lens irradiating the recording laser beam is 0.65±0.02.

4. A recording method according to claim 2, wherein the numerical aperture of the lens irradiating the reproducing laser beam is 0.60±0.02.

5. A recording method according to claim 1, wherein the recording laser beam has a wavelength of from 630–70 nm.

6. An optical information medium comprising:
   a first transparent substrate for allowing recording and/or reproducing laser beams to penetrate therethrough, said first transparent substrate having a spiral groove formed therein and a full width at half maximum of the groove is ⅓–½ of the pitch of the groove;
   an organic dye recording layer formed on said first transparent substrate and comprising a land portion and a groove portion;
   and a second transparent substrate bonded to the first transparent substrate through an adhesive layer formed by hardening a reactive curable resin.

7. An optical information medium according to claim 6, wherein an annular protuberance is provided on the surface of the first transparent substrate on which the recording and/or reproducing laser beams are incident.

8. A recording method according to claim 1, additionally comprising the step of providing a reflective layer on the recording layer.

9. A recording method according to claim 8, additionally comprising the step of providing a protective layer on the reflective layer.

10. A recording method according to claim 9, additionally comprising the step of providing an adhesive layer on the protective layer.

11. A recording method according to claim 10, additionally comprising the step of providing a second substrate on the adhesive layer, the second substrate not having a groove provided therein.

12. A recording method according to claim 9, additionally comprising the step of providing a reflective layer, a recording layer and a second substrate having a groove provided therein, in that order, on the protective layer.

13. A recording method according to claim 11, wherein the second substrate is not transparent.

14. An optical information medium according to claim 6, wherein a reflective layer is provided on the recording layer.

15. An optical information medium according to claim 14, wherein a protective layer is provided on the reflective layer.

16. An optical information medium according to claim 15, wherein the adhesive layer is provided on the protective layer.

17. An optical information medium according to claim 6, wherein the second transparent substrate does not have a groove provided therein.

18. An optical information medium comprising:
   a first transparent substrate for allowing recording and/or reproducing laser beams to penetrate therethrough, said first transparent substrate having a spiral groove formed therein and a full width at half maximum of the groove is ⅓–½ of the pitch of the groove;
   an organic dye recording layer formed on said first transparent substrate and comprising a land portion and a groove portion;

a reflective layer formed on the recording layer;

a protective layer formed on the reflective layer;

a second reflective layer formed on the protective layer;

a second recording layer formed on the second reflective layer; and a second transparent substrate formed on the second recording layer.

19. A recording method according to claim 1, wherein the thickness of the transparent substrate is 0.6 mm.

20. A recording method according to claim 1, wherein both edges of the groove have an inclination angle, with respect to a recording laser beam incident surface of the transparent substrate, of from 55–75 degrees.

21. An optical information medium according to claim 6, wherein the thickness of the transparent substrate is 0.6 mm.

22. An optical information medium according to claim 6, wherein both edges of the groove have an inclination angle, with respect to a recording laser beam incident surface of the transparent substrate, of from 55–75 degrees.

23. An optical information medium according to wherein the thickness of the transparent substrate is 0.6 mm.

24. An optical information medium according to claim 18, wherein both edges of the groove have an inclination angle, with respect to a recording laser beam incident surface of the transparent substrate, of from 55–75 degrees.

* * * * *

UNITED STATES PATENT AND TRADEMARK OFFICE
CERTIFICATE OF CORRECTION

PATENT NO.    : 6,728,198 B2
DATED         : April 27, 2004
INVENTOR(S)   : Fujii et al.

It is certified that error appears in the above-identified patent and that said Letters Patent is hereby corrected as shown below:

Column 10,
Line 12, change "630-70" to -- 630-670 --.

Column 12,
Line 7, after "to" insert -- Claim 18, --.

Signed and Sealed this

Twenty-first Day of September, 2004

JON W. DUDAS
*Director of the United States Patent and Trademark Office*